United States Patent
Lin (10) Patent No.: US 10,019,614 B1
(45) Date of Patent: Jul. 10, 2018

(54) IMAGE CAPTURE DEVICE CAPABLE OF FORMING AIMING PATTERN ACCORDING TO SHAPE OF GRATING, AND ELECTRONIC APPARATUS INCLUDING SAME

(71) Applicant: CipherLab Co., Ltd., Taipei (TW)

(72) Inventor: Kuan-Hung Lin, Taipei (TW)

(73) Assignee: CIPHERLAB CO., LTD., Taipei (TW)

( * ) Notice: Subject to any disclaimer, the term of this patent is extended or adjusted under 35 U.S.C. 154(b) by 0 days.

(21) Appl. No.: 15/497,269

(22) Filed: Apr. 26, 2017

(30) Foreign Application Priority Data

Dec. 27, 2016 (TW) .............................. 105143335 A (51) Int. Cl.
*G06K 7/10* (2006.01)

(52) U.S. Cl.
CPC ..... *G06K 7/10881* (2013.01); *G06K 7/10831* (2013.01); *G06K 2007/10485* (2013.01); *G06K 2007/10524* (2013.01)

(58) Field of Classification Search
CPC .. G06K 7/10; G06K 7/14; G06K 5/00; G06K 15/12; G06F 17/00; G03B 7/08
USPC ......... 235/462.01, 454, 375, 462.11, 462.24, 235/462.41, 462.42
See application file for complete search history.

(56) References Cited

U.S. PATENT DOCUMENTS

| | | | | |
|---|---|---|---|---|
| 6,060,722 A | * | 5/2000 | Havens | G06K 7/10732 235/462.2 |
| 6,347,163 B2 | * | 2/2002 | Roustaei | G03F 7/705 235/462.21 |
| 2008/0164315 A1 | * | 7/2008 | Pankow | G06K 7/10732 235/462.42 |
| 2011/0186636 A1 | * | 8/2011 | Hyde | G06K 7/10 235/454 |

* cited by examiner

*Primary Examiner* — Edwyn Labaze
(74) *Attorney, Agent, or Firm* — McClure, Qualey & Rodack, LLP (57) ABSTRACT

An image capture device capable of forming an aiming pattern according to a shape of a grating includes a body, an image capture module, and a light source. The body includes a tubular chamber and a light source chamber. One end of the tubular chamber is connected to the light source chamber, and the other end is connected to a first surface of the body. In addition, a grating is disposed between the tubular chamber and the light source chamber, and the grating has a shape capable of forming an aiming pattern. The image capture module is disposed on the body. The light source is disposed in the light source chamber, and a light beam emitted by the light source may pass through the grating and the tubular chamber and exit through the first surface to generate an aiming pattern corresponding to the shape of the grating.

18 Claims, 7 Drawing Sheets

IMAGE CAPTURE DEVICE CAPABLE OF FORMING AIMING PATTERN ACCORDING TO SHAPE OF GRATING, AND ELECTRONIC APPARATUS INCLUDING SAME

CROSS-REFERENCE TO RELATED APPLICATION

This non-provisional application claims priority under 35 U.S.C. § 119(a) to Patent Application No. 105143335 filed in Taiwan, R.O.C. on Dec. 27, 2016, the entire contents of which are hereby incorporated by reference.

BACKGROUND

Technical Field

The present invention relates to an image capture device, and in particular, to an image capture device capable of forming an aiming pattern according to a shape of a grating. The present invention also relates to an electronic apparatus including the image capture device.

Related Art

The barcode technology is a common automatic recognition and data collection technology. So far, different types of barcodes have been developed, and are applied to various fields. To read a barcode, a barcode reader needs to be used. The barcode reader may read quickly a barcode by using an image capture device and input the barcode to a computer, so as to achieve quick and accurate input and save manpower.

To enable the image capture device of the barcode reader to aim at a barcode and read the barcode, a light source needs to be disposed in the image capture device. A light beam may be emitted by the light source and may be irradiated onto a target object to form an aiming pattern. In this way, a user may point, according to the aiming pattern, the image capture device of the barcode reader at the barcode on the target object, so as to read the barcode. However, because the light source needs to be disposed in the image capture device, a corresponding structure and components are required in the image capture device. Both the structure and the components greatly increase structure complexity of the image capture device. As a result, costs of the image capture device are increased.

In addition, because the structure complexity of the image capture device is relatively high, the assembly procedure of the image capture device is relatively complex. As a result, the assembly tolerance needs to be larger, and quality of the image capture device is lowered.

Therefore, it is an urgent task to provide an image capture device that can effectively resolve the problem in the prior art that costs of an image capture device are too high and quality is poor.

SUMMARY

In view of the foregoing problem in the prior art, an objective of the present invention is to provide an image capture device capable of forming an aiming pattern according to a shape of a grating, so as to manage and control costs of the image capture device effectively.

According to an objective of the present invention, an image capture device is provided. The image capture device may include a body, an image capture module, and a light source. The body may include a tubular chamber and a light source chamber. One end of the tubular chamber may be connected to the light source chamber, and the other end may be connected to a first surface of the body. In addition, a grating may be disposed between the tubular chamber and the light source chamber, and the grating has a shape capable of forming an aiming pattern. The image capture module may be disposed on the body. The light source may be disposed in the tubular chamber, a light beam emitted by the light source may pass through the grating and the tubular chamber and exit through the first surface to generate the aiming pattern corresponding to the shape of the grating.

According to an objective of the present invention, an electronic apparatus is further provided. The electronic apparatus may include a housing and an image capture device. The image capture device may be disposed in the housing. The image capture device may include a body, an image capture module, and a light source. The body may include a tubular chamber and a light source chamber. One end of the tubular chamber may be connected to the light source chamber, and the other end may be connected to a first surface of the body. In addition, a grating may be disposed between the tubular chamber and the light source chamber, and the grating has a shape capable of forming an aiming pattern. The image capture module may be disposed on the body. The light source may be disposed in the tubular chamber, a light beam emitted by the light source may pass through the grating and the tubular chamber and exit through the first surface to generate the aiming pattern corresponding to the shape of the grating.

In an exemplary embodiment, a center of the shape of the grating may be a circle or a polygon. In addition, there may be a plurality of round protrusions, a plurality of polygonal protrusions, or a plurality of irregular protrusions around the center of the shape of the grating.

In an exemplary embodiment, both an inner surface of the tubular chamber and that of the light source chamber have a structure in which stray light generated by the light source is not easily reflected.

In an exemplary embodiment, the image capture device may further include a spacer, the spacer may be disposed between the tubular chamber and the light source chamber, and the grating may be located on the spacer.

In an exemplary embodiment, the tubular chamber and the light source chamber may be integrally formed, and the grating may be located on an interface between the tubular chamber and the light source chamber.

In an exemplary embodiment, the tubular chamber may include a chamber body and a conical chamber, and the chamber body may be connected to the light source chamber by using the conical chamber.

In an exemplary embodiment, the tubular chamber, the light source, and the grating may be formed at the same time by means of injection molding.

In an exemplary embodiment, the image capture device may further include a first circuit board and an auxiliary light source. The first circuit board may be disposed on the first surface, and the auxiliary light source may be disposed on the first circuit board.

In an exemplary embodiment, a base board may be disposed on the first circuit board, and the base board may include a lens. The lens may correspond to the auxiliary light source.

In an exemplary embodiment, the image capture device may further include a second circuit board. The second circuit board may be disposed on a second surface of the body, and the second surface may be opposite to the first surface. The light source may be disposed on the second circuit board.

In an exemplary embodiment, the image capture device may further include a third circuit board. The third circuit board may be disposed on a third surface of the body, and may connect the first circuit board and the second circuit board.

Based on the above, the image capture device and the electronic apparatus including the image capture device according to the present invention may have one or more of the following advantages:

(1) In an embodiment of the present invention, the body of the image capture device may be formed by means of injection molding, so that the tubular chamber, the light source chamber, and the grating of the body may be integrally formed. Therefore, the structure and components required for arranging the light source may be greatly reduced, the structure complexity of the image capture device is reduced, and the assembly tolerance is reduced. Therefore, quality of the image capture device may be improved. In addition, the grating having a specific shape may be formed at the same time, so that the process may be shortened, and costs are further reduced.

(2) In an embodiment of the present invention, the image capture device has the grating that can form the shape of the aiming pattern. The center of the shape of the grating is a geometric shape, and there may be a plurality of fan-shaped, triangle, or elongated protrusions around the center. By using the shape of the grating, an aiming pattern corresponding to a light beam may be generated when the light beam passes through the grating. The aiming pattern generated herein may be obviously distinguished from a conventional cross-shape aiming pattern, and therefore different aiming patterns may be provided for electronic apparatuses of different brands, so that brand recognition and commercial value may be improved.

(3) In an embodiment of the present invention, because the image capture device has an improved structure design, a light emitting diode may be directly used as the light source, so as to further reduce costs of the image capture device.

(4) In an embodiment of the present invention, the image capture device has the specially-designed tubular chamber, and both the inner surface of the tubular chamber and that of the light source chamber have a structure in which stray light generated by the light source is not easily reflected, so that the stray light may be eliminated effectively. Therefore, the light source may form a clearer aiming pattern, and performance of the image capture device is further improved.

(5) The image capture device of the present invention may be applied to different electronic apparatuses and may achieve excellent performance, and therefore can be used extensively.

DETAILED DESCRIPTION

With reference to the figures, the following describes embodiments of an image capture device and an electronic apparatus including the image capture device according to the present invention. To describe the figures clearly and conveniently, the components may be enlarged or reduced in size and scale. In the following descriptions and/or claims, when it is mentioned that a component is "connected to" or "is coupled to" another component, the component may be directly connected to or coupled to another component or there may be a component therebetween; or when it is mentioned that a component "is directly connected to" or "is directly coupled to" another component, there is no component therebetween. Other terms used to describe the relationship between components or layers should be explained in a same manner. For ease of understanding, the same component is described by using the same reference numeral in the following embodiments.

Figure 1:
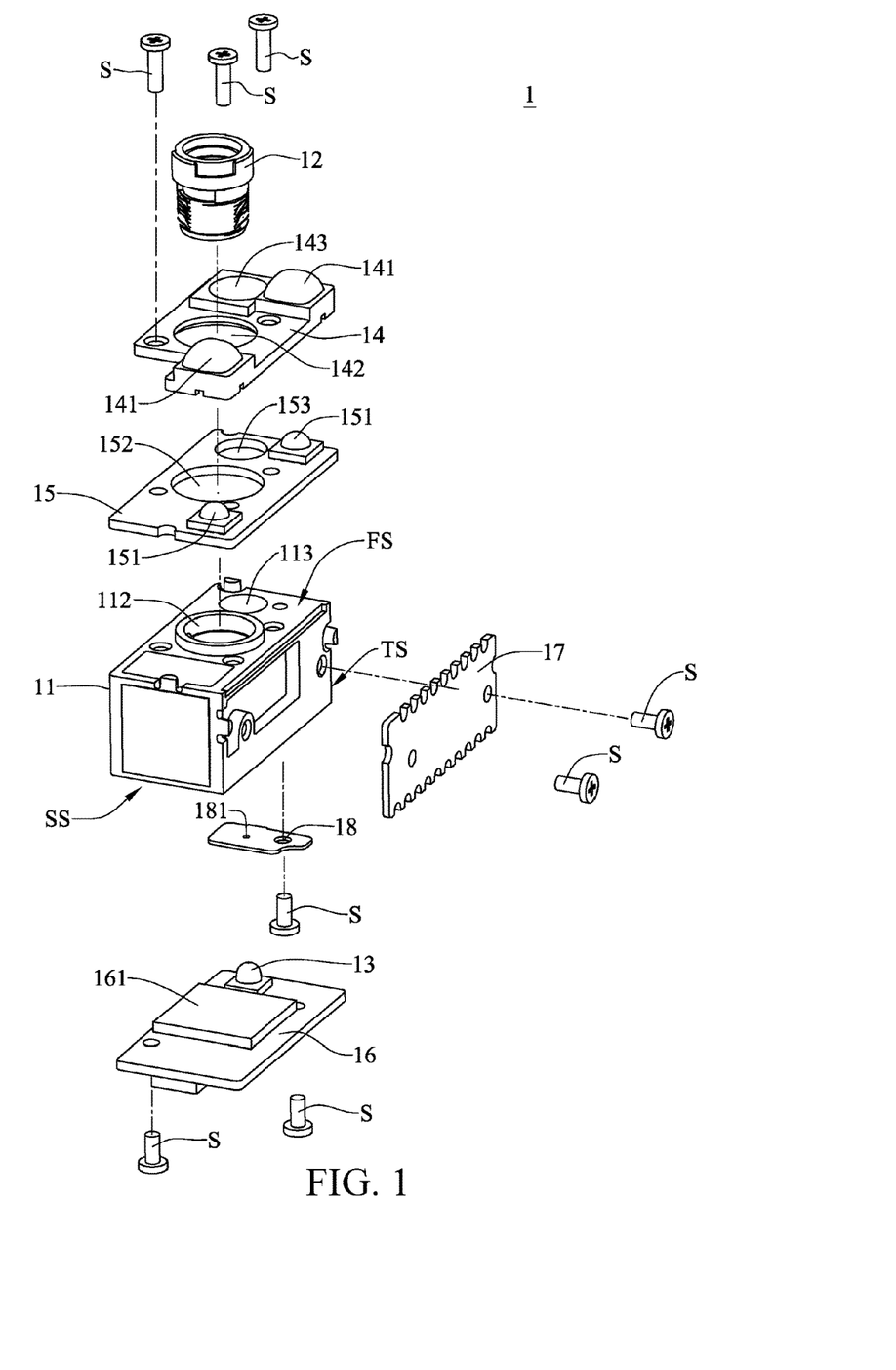
FIG. 1 is an exploded view of an image capture device according to first embodiment of the present invention.
Figure 2:
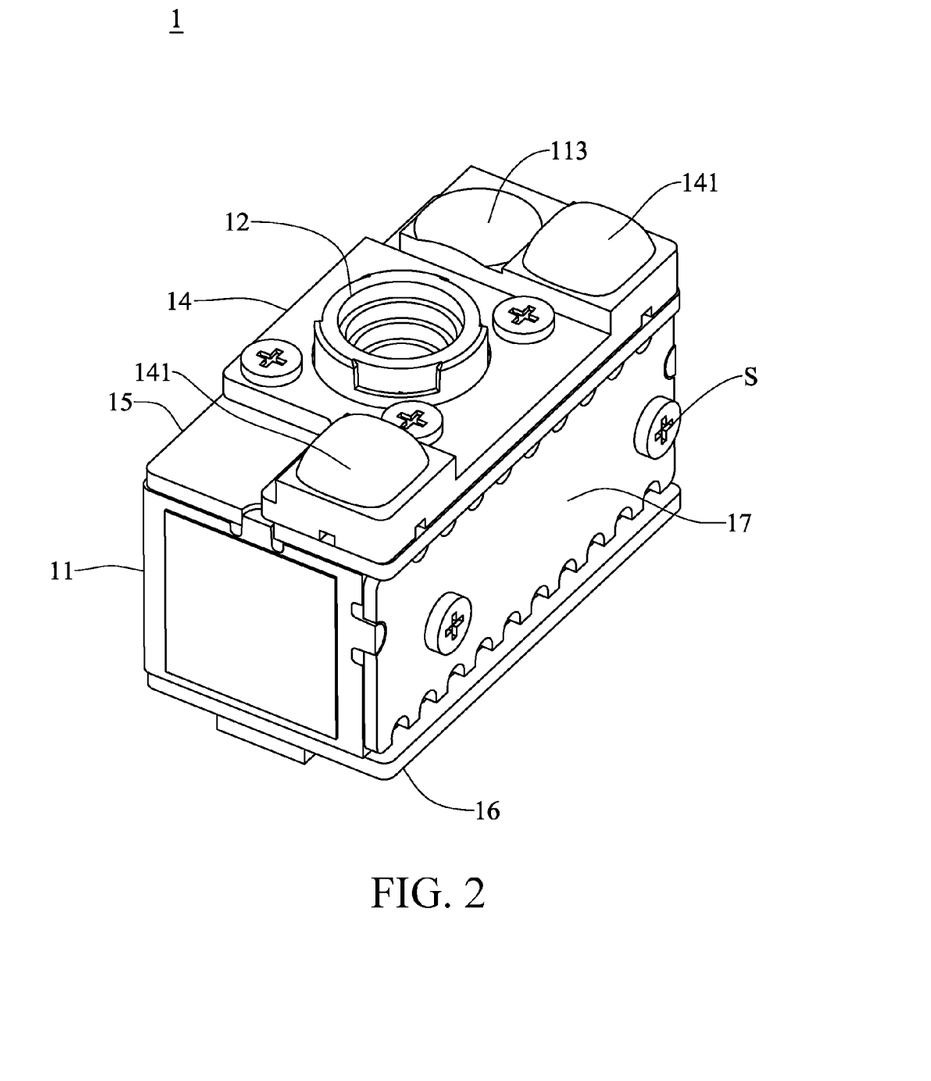
FIG. 2 is a combined view of the image capture device according to first embodiment of the present invention.
Figure 3:
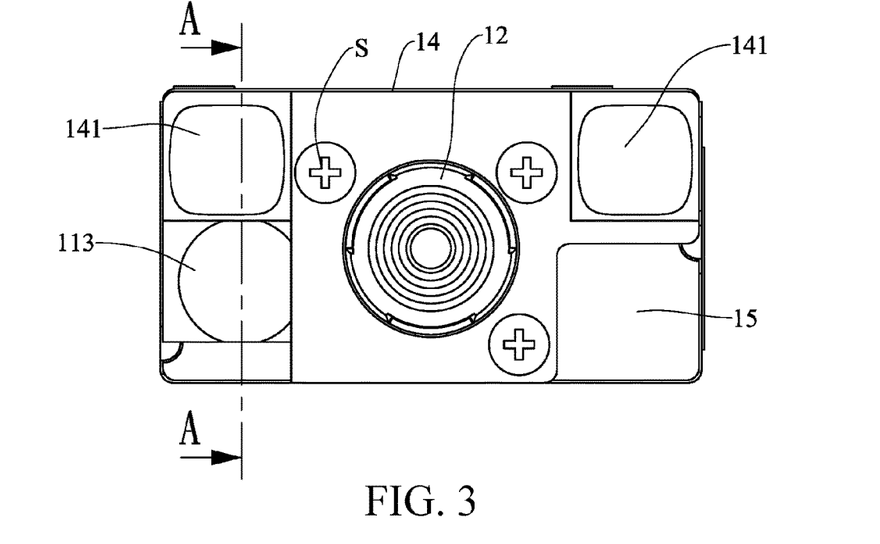
FIG. 3 is a top view of the image capture device according to first embodiment of the present invention.
Figure 4:
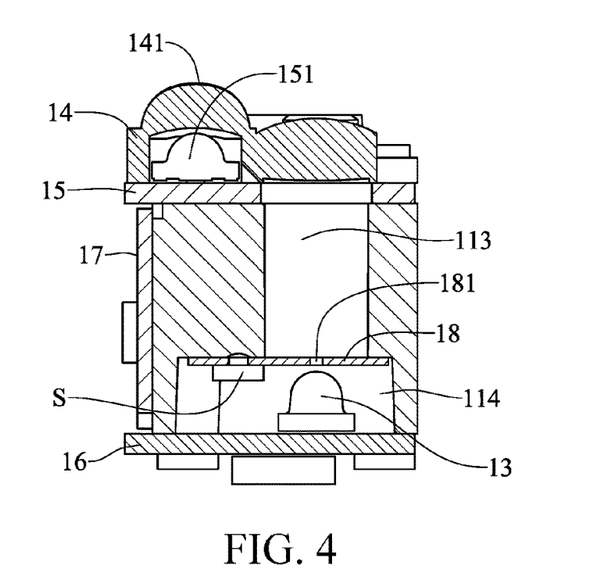
FIG. 4 is an A-A sectional view of the image capture device according to first embodiment of the present invention.

Referring to FIG. 1 to FIG. 4, FIG. 1 and FIG. 2 are respectively an exploded view and a combined view of an image capture device according to first embodiment of the present invention. FIG. 3 and FIG. 4 are respectively a top view and an A-A sectional view of the image capture device according to first embodiment of the present invention. As shown in the figures, an image capture device 1 may include a body 11, an image capture module 12, a photosensitive element 161, a light source 13, an auxiliary light source 151, a base board 14, a first circuit board 15, a second circuit board 16, a third circuit board 17, and a spacer 18. The base board 14, the first circuit board 15, the second circuit board 16, the third circuit board 17, and the spacer 18 may all be locked on the body 11 by using a locking component S such as a screw.

The body 11 may include a tubular chamber 113 and a light source chamber 114. One end of the tubular chamber 113 may be connected to the light source chamber 114, and the other end may be connected to a first surface FS of the body 11.

The image capture module 12 may be disposed on a base 112 of the body 11, and may be disposed at a central position of the body 11. Auxiliary light sources 151 may be disposed on two sides of the image capture module 12, while the tubular chamber 113 may be disposed on one side of the image capture module 12.

The light source 13 may be disposed on the second circuit board 16, and may be disposed in the light source chamber. A light beam emitted by the light source 13 may pass through a grating 181 and the tubular chamber 113 and exit through the first surface FS. In an exemplary embodiment, the light source 13 may be a light emitting diode.

The first circuit board 15 may be disposed on the first surface FS, and may include a first through hole 152 and a second through hole 153. The auxiliary light source 151 may be disposed on the first circuit board 15. The first through hole 152 may correspond to the image capture module 12, and the second through hole 153 may correspond to the tubular chamber 113.

The base board 14 may be disposed on the first circuit board 15, and the base board 14 may include a first lens 141, a third through hole 142, and a second lens 143. The first lens 141 may correspond to the auxiliary light source 151, the third through hole 142 may correspond to the image capture module 12, and the second lens 143 may correspond to the tubular chamber 113.

As shown in FIG. 4, the spacer 18 may be disposed between the tubular chamber 113 and the light source chamber 114. The spacer 18 may include the grating 181. The grating 181 may be a micro structure and has a shape for generating an aiming pattern.

The second circuit board 16 may be disposed on a second surface SS of the body 11, and the second surface SS may be opposite to the first surface FS. The light source 13 and the photosensitive element 161 may be disposed on the second circuit board 16.

The third circuit board 17 may be disposed on a third surface TS of the body 11, and may connect the first circuit board 15 and the second circuit board 16.

By using the foregoing structures, a light beam emitted by the light source 13 located in the light source chamber 114 may pass through the grating 181, the tubular chamber 113, the second through hole 153, and the second lens 143, and exit through the first surface FS, and may be irradiated onto a target object to form an aiming pattern, so as to help a user to aim the image capture module 12 at a barcode on the target object. Because the grating 181 has a shape, after passing through the grating 181, the light beam emitted by the light source 13 may be irradiated onto the target object to form a corresponding aiming pattern.

In addition, the auxiliary light source 151 may provide auxiliary light to ensure sufficient ambient light. In this way, a user may conveniently use an electronic apparatus (referring to FIG. 5) having the image capture device 1 to capture an image of a barcode, and may convert, by using the photosensitive element 161, the image of the barcode into a digital signal that may be recognized by a computer. The foregoing barcode may be a one-dimensional barcode, a two-dimensional barcode, or different other barcodes.

It may be learned from the above that though having the light source 13, the image capture device 1 has a simple structure. As a result, the structure complexity of the image capture device 1 is greatly reduced, and costs of the image capture device 1 are reduced relatively.

In addition, the structure of the image capture device 1 allows a light emitting diode to be used light source, thereby further reducing costs of the image capture device 1.

Of course, the foregoing content is merely an example, and is not used to limit the present invention. The structure of the image capture device 1, the connection relationship among the components, and the functions thereof may all be changed according to an actual requirement. The shape of the grating may be a combination according to an actual requirement. The present invention is not limited thereto.

Figure 5:
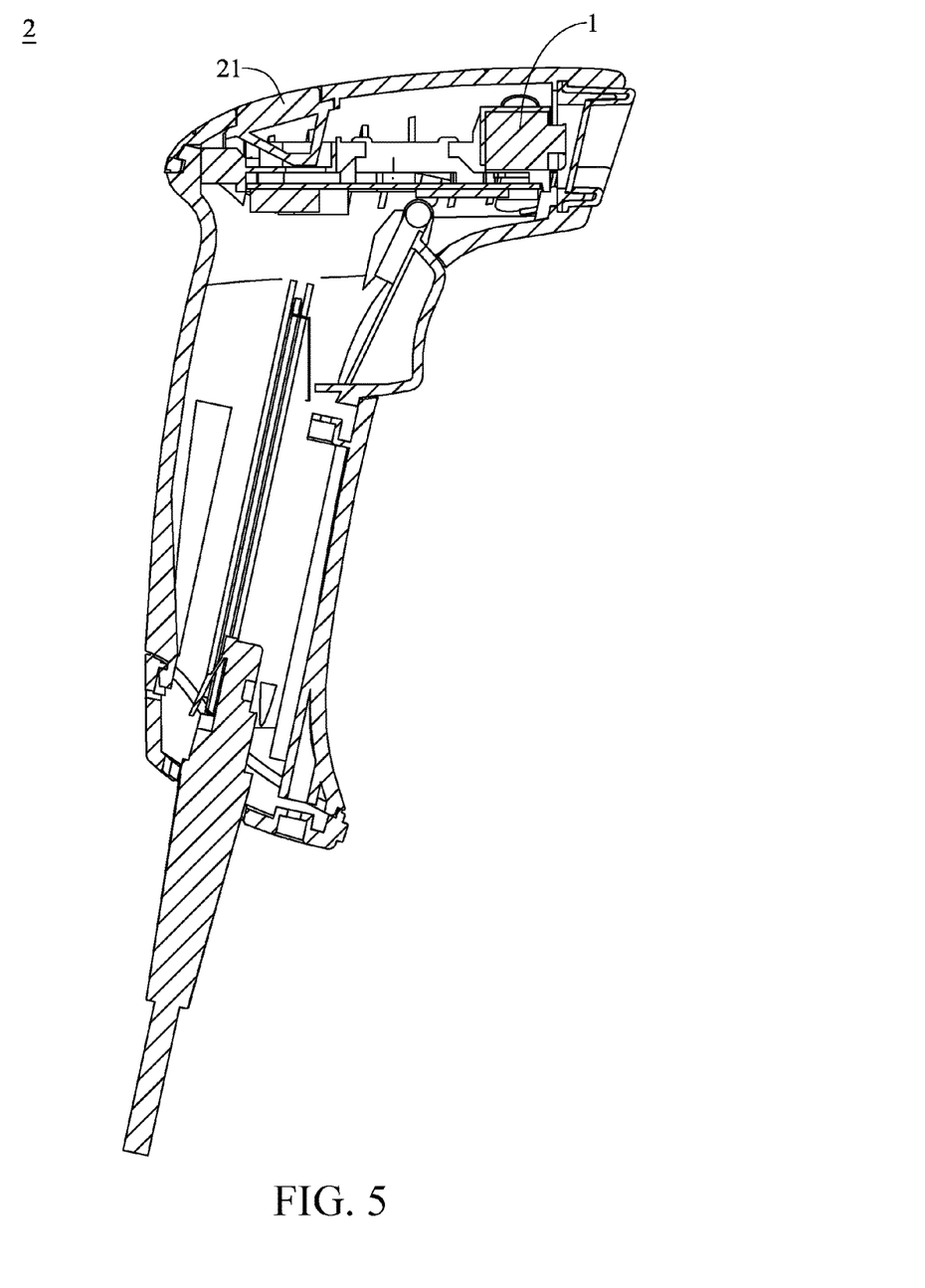
FIG. 5 is a schematic diagram of an electronic apparatus having the image capture device according to first embodiment of the present invention.

Referring to FIG. 5, FIG. 5 is a schematic diagram of an electronic apparatus having the image capture device according to first embodiment of the present invention. As shown in FIG. 5, the image capture device 1 may be disposed in a housing 21 of an electronic apparatus 2, so that the electronic apparatus 2 has a barcode reading function. In this embodiment, the electronic apparatus 2 may be a barcode reader.

Of course, the image capture device 1 in this embodiment may further be disposed in different other electronic apparatuses, such as a mobile phone, a tablet computer, a palm-size terminal, and an industrial computer.

It should be noted that in the prior art, to arrange a source light in an image capture device, a complex structure and corresponding components are used inside the image capture device, and therefore the structure complexity of the image capture device is greatly increased, and costs of the image capture device are greatly increased. On the contrary, according to an embodiment of the present invention, the structure of the image capture device is relatively simple, and therefore the structure complexity of the image capture device may be greatly reduced, and costs of the image capture device are reduced.

Figure 6:
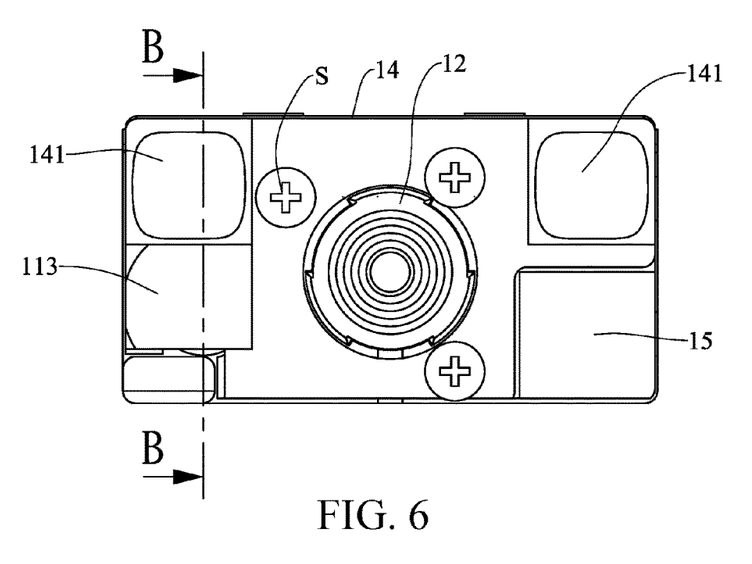
FIG. 6 is a top view of an image capture device according to second embodiment of the present invention.
Figure 7:
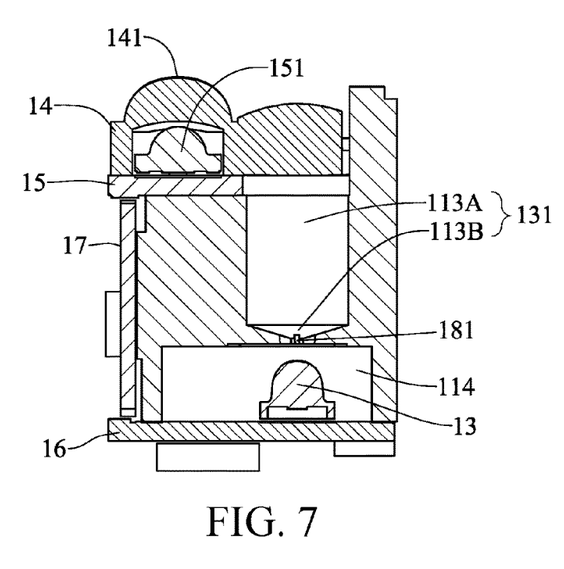
FIG. 7 is a B-B sectional view of the image capture device according to second embodiment of the present invention.

Referring to FIG. 6 and FIG. 7, FIG. 6 and FIG. 7 are a top view and a B-B sectional view of an image capture device according to second embodiment of the present invention. This embodiment describes another exemplary structure of the image capture device 1 (referring to FIG. 5) by using an example.

As shown in FIG. 6, the image capture module 12 may be disposed at a center of the body 11 (referring to FIG. 2), and the auxiliary light sources 151 (referring to FIG. 1) and the corresponding first lenses 141 may be disposed on two sides of the image capture module 12. The tubular chamber 113 may be disposed on one side of the image capture module 12.

As shown in FIG. 7, the tubular chamber 113 may include a chamber body 113A and a conical chamber 113B. The chamber body 113A may be connected to the light source chamber 114 by using the conical chamber 113B. The tubular chamber 113 and the light source chamber 114 may be formed by means of injection molding, so that the tubular chamber 113 has the foregoing special structure, and that the tubular chamber 113 and the light source chamber 114 are integrally formed. In addition, the grating 181 may be formed in an interface between the tubular chamber 113 and the light source chamber 114 at the same time. The grating 181 may be a micro structure and has a shape, so as to generate an aiming pattern.

Figure 8:
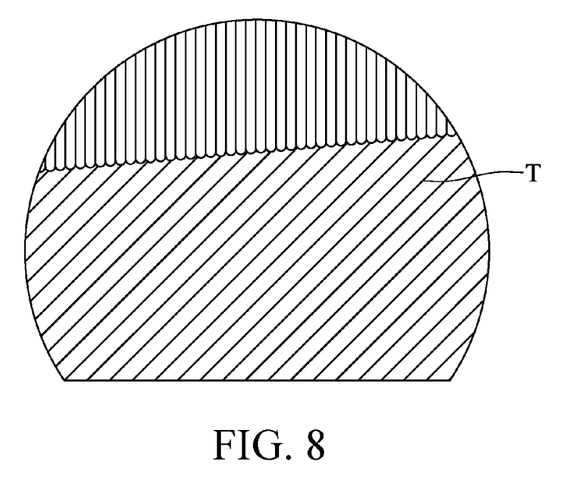
FIG. 8 is a sectional view of a tubular chamber of the image capture device according to second embodiment of the present invention.

In addition, in this embodiment, both an inner surface of the tubular chamber 113 and that of the light source chamber 114 have a structure T (as shown in FIG. 8) in which stray light generated by a light source is not easily reflected, so that rough structures are formed on the inner surfaces of the tubular chamber 113 and the light source chamber 114. In this way, when the stray light of the light source 13 contacts the structure T of the tubular chamber 113 and the light source chamber 114 in which the stray light generated by the light source is not easily reflected, the stray light is not easily reflected, and the stray light of the light source 13 may be eliminated effectively. Therefore, the light source 13 may form a clearer aiming pattern, and performance of the image capture device 1 (referring to FIG. 5) is further improved. The structure T of both the inner surface of the tubular chamber 113 and that of the light source chamber 114 in which the stray light is not easily reflected may be as shown in FIG. 8. Of course, the structure T in which the stray light generated from the light source is not easily reflected shown in FIG. 8 is merely an exemplary example, and the structure T may be changed according to an actual requirement. The present invention is not limited thereto.

Because other structures of the image capture device 1 in this embodiment is similar to that of the foregoing embodiment, details are not described herein again.

By using the foregoing structures, the light beam emitted by the light source 13 located in the light source chamber 114 may pass through the grating 181, the tubular chamber 113, the second through hole 153, and the second lens 143 (referring to FIG. 1) and exit through the first surface FS of the body, and may be irradiated onto a target object to form an aiming pattern, so as to help a user to aim the image capture module 12 at a barcode on the target object. Because the grating 181 has a shape, after passing through the grating 181, the light beam emitted by the light source 13 may be irradiated onto the target object to form a corresponding aiming pattern.

In addition, in this embodiment, the tubular chamber 113, the light source chamber 114, and the grating 181 may be integrally formed by the image capture device 1 by means of injection molding. Therefore, the structure is further simplified, a structure complexity of the image capture device 1 is greatly reduced, and costs of the image capture device 1 are further reduced.

In addition, the image capture device 1 may also has a structure of the tubular chamber 113, and may form a structure T on an inner surface to eliminate the stray light of the light source 13 effectively, for example, reflected light or a light beam whose irradiation direction is different from a central light beam of the light source 13. Therefore the image capture device may have better performance.

Figure 9:
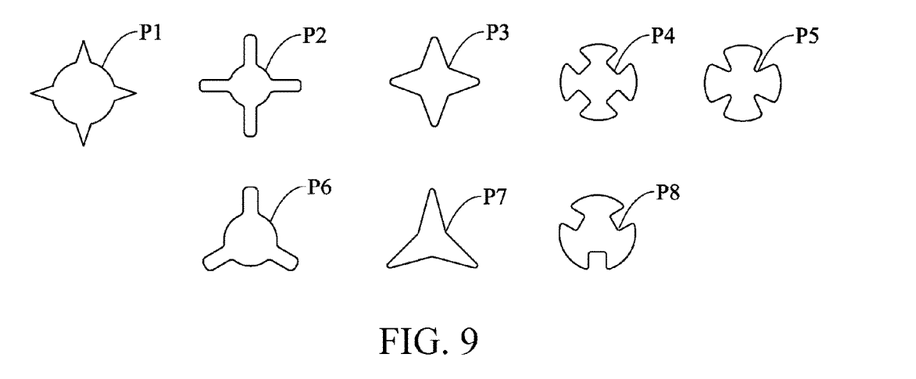
FIG. 9 is a schematic diagram of an aiming pattern of the image capture device according to second embodiment of the present invention.

Referring to FIG. 9, FIG. 9 is a schematic diagram of an aiming pattern of the image capture device according to second embodiment of the present invention. Each aiming pattern may also represent the shape of the grating. A center of an aiming pattern may be a circle or a polygon. It may be seen from FIG. 9, a center of an aiming pattern P1 may be a circle, and there may be a plurality of triangular protrusions around the circle. A center of an aiming pattern P2 may be a circle, and there may be a plurality of elongated protrusions around the circle. A center of an aiming pattern P3 may be a rectangle, and there may be a plurality of triangular protrusions around the rectangle. A center of an aiming pattern P4 may be a hexagon, and there may be a plurality of fan-shaped protrusions around the hexagon. A center of an aiming pattern P5 may be a rectangle, and there may be a plurality of fan-shaped protrusions around the rectangle. An aiming pattern P6 is similar to the aiming pattern P2. A center of an aiming pattern P7 may be a triangle, and there may be a plurality of triangular protrusions around the triangle. An aiming pattern P8 is similar to the aiming pattern P4. The aiming patterns generated above may be obviously distinguished from a conventional cross-shape aiming pattern, and therefore different aiming patterns may be provided for electronic apparatuses of different brands, so that brand recognition and commercial value may be improved effectively.

It should be noted that according to the embodiments of the present invention, the body of the image capture device may be formed by means of injection molding, so that the tubular chamber, the light source chamber, and the grating of the body may be integrally formed. In addition, the grating having a shape may be formed at the same time in a process, thereby shortening the process and further reducing costs. Of course, the foregoing content is merely an example, and is not used to limit the present invention. The structure of the image capture device 1 (referring to FIG. 5), the connection relationship among the components, and the functions may all be changed according to an actual requirement. The present invention is not limited thereto.

It may be seen that the present invention has made a breakthrough to the prior art and has indeed made intended progress, and is not easily conceived of by persons skilled in the art. The present invention meets the inventive step and applicability requirements of a patent application, and therefore, the patent is applied for in accordance with the law. We adjure authorization of the patent application of the present invention from the patent office, so as to encourage creation. We express our sincere appreciation.

The foregoing is merely an example instead of a limitation. Any other equivalent modification or alteration to the present invention without departing from the scope and spirit of the present invention shall fall within the protection scope of the attached claims.

What is claimed is:

1. An image capture device, comprising:
   a body, comprising a tubular chamber and a light source chamber, wherein an end of the tubular chamber is connected to the light source chamber, and the other end is connected to a first surface of the body, a grating is disposed between the tubular chamber and the light source chamber, and the grating has a shape;
   an image capture module, disposed on the body; and
   a light source, disposed in the light source chamber, wherein a light beam emitted by the light source passes through the grating and the tubular chamber and exits through the first surface to generate an aiming pattern corresponding to the shape of the grating,
   wherein both an inner surface of the tubular chamber and that of the light source chamber have a structure in which stray light generated by the light source is not easily reflected.

2. The image capture device according to claim 1, wherein a center of the grating is a circle or a polygon.

3. The image capture device according to claim 2, wherein a plurality of round protrusions, a plurality of polygonal protrusions, or a plurality of irregular protrusions is disposed around the center of the grating.

4. The image capture device according to claim 1, further comprising a spacer, wherein the spacer is disposed between the tubular chamber and the light source chamber, and the grating is located on the spacer.

5. The image capture device according to claim 1, wherein the tubular chamber and the light source chamber are integrally formed, and the grating is located on an interface between the tubular chamber and the light source chamber.

6. The image capture device according to claim 5, wherein the tubular chamber comprises a chamber body and a conical chamber, and the chamber body is connected to the light source chamber by using the conical chamber.

7. The image capture device according to claim 5, wherein the tubular chamber, the light source chamber, and the grating are formed at the same time by means of injection molding.

8. The image capture device according to claim 1, further comprising a first circuit board and an auxiliary light source, wherein the first circuit board is disposed on the first surface, and the auxiliary light source is disposed on the first circuit board.

9. The image capture device according to claim 8, further comprising a base board disposed on the first circuit board, wherein the base board comprises a lens, and the lens corresponds to the auxiliary light source.

10. The image capture device according to claim 8, further comprising a second circuit board, wherein the second circuit board is disposed on a second surface of the body, the second surface is opposite to the first surface, and the light source is disposed on the second circuit board.

11. The image capture device according to claim 10, further comprising a third circuit board, wherein the third circuit board is disposed on a third surface of the body, and connects the first circuit board and the second circuit board.

12. An electronic apparatus, comprising a housing and an image capture device, wherein the image capture device is disposed in the housing and comprises:
a body, comprising a tubular chamber and a light source chamber, wherein an end of the tubular chamber is connected to the light source chamber, and the other end is connected to a first surface of the body, a grating is disposed between the tubular chamber and the light source chamber, and the grating has a shape; and
an image capture module, disposed on the body; and a light source, disposed in the light source chamber, wherein a light beam emitted by the light source passes through the grating and the tubular chamber and exits through the first surface to generate an aiming pattern corresponding to the shape of the grating,
wherein both an inner surface of the tubular chamber and that of the light source chamber have a structure in which stray light generated by the light source is not easily reflected.

13. The electronic apparatus according to claim 12, wherein a center of the grating is a circle or a polygon.

14. The electronic apparatus according to claim 13, wherein a plurality of round protrusions, a plurality of polygonal protrusions, or a plurality of irregular protrusions is disposed around the center of the grating.

15. The electronic apparatus according to claim 12, wherein the image capture device further comprises a spacer, the spacer is disposed between the tubular chamber and the light source chamber, and the grating is located on the spacer.

16. The electronic apparatus according to claim 12, wherein the tubular chamber and the light source chamber are integrally formed, and the grating is located on an interface between the tubular chamber and the light source chamber.

17. The electronic apparatus according to claim 16, wherein the tubular chamber comprises a chamber body and a conical chamber, and the chamber body is connected to the light source chamber by using the conical chamber.

18. The electronic apparatus according to claim 16, wherein the tubular chamber, the light source chamber, and the grating are formed at the same time by means of injection molding.

* * * * *